United States Patent [19]
Clark, Jr.

[11] Patent Number: 5,624,129
[45] Date of Patent: Apr. 29, 1997

[54] RETRACTABLE TRAILER TONGUE

[76] Inventor: Anderson L. Clark, Jr., 203 Clark La., Tullahoma, Tenn. 37388

[21] Appl. No.: 539,272

[22] Filed: Oct. 4, 1995

[51] Int. Cl.⁶ .................... B60D 1/155; B60D 1/54
[52] U.S. Cl. ...................... 280/478.1; 280/491.3
[58] Field of Search ............... 280/491.1, 491.2, 280/491.3, 491.4, 479.2, 479.3, 482, 478.1, 414.1

[56] References Cited

U.S. PATENT DOCUMENTS

| | | | |
|---|---|---|---|
| 2,582,595 | 1/1952 | Leveke | 280/482 X |
| 3,102,649 | 9/1963 | Whalen | 214/505 |
| 3,207,530 | 9/1965 | Paun | 280/478 |
| 3,437,355 | 4/1969 | Jeffes | 280/478 |
| 4,147,374 | 4/1979 | Jeffes | 280/478 |
| 4,398,742 | 8/1983 | Sanders | 280/491 |
| 4,623,161 | 11/1986 | Sprague | 280/414.1 |
| 4,626,162 | 12/1986 | Parisi | 280/414.1 X |
| 4,726,601 | 2/1988 | Stevens | 180/414.1 |
| 5,011,176 | 4/1991 | Eppinette | 280/491.2 X |
| 5,213,354 | 5/1993 | Vaughn | 280/479.2 |
| 5,263,734 | 11/1993 | Coenen et al. | 280/479.1 |

*Primary Examiner*—Kevin Hurley
*Attorney, Agent, or Firm*—I. C. Waddey, Jr.; Waddey & Patterson

[57] ABSTRACT

A retractable tongue for a boat trailer, the retractable tongue including a slide and a slide housing, the slide being pivotally connected to the slide housing by a pin fitted through elongated slots in each side of the slide housing. The structure is enclosed in a housing to protect it from the elements and the housing has holes on each side of it through which a locking bar can be passed to lock the retractable tongue in a dropped down, inoperable position to thwart unauthorized use of the trailer. When the locking bar is removed, the slide can be rotated into an operable position and slid forward and locked into position for towing. A coupler is attached to the free end of the slide to provide a brake actuator between the towing vehicle and the trailer. The remote end of the slide is terminated at an angle to the axis of the slide so that the slide can rotate within the slide housing a pre-determined distance to an inoperable position, but the slide will not rotate beyond a controlled point, thus forcing the slide to terminate in a dig-in position that would prevent the trailer from being towed should an unauthorized user attempt to move the trailer.

8 Claims, 7 Drawing Sheets

RETRACTABLE TRAILER TONGUE

APPLICATION FOR UNITED STATES LETTERS PATENT

Be it hnown that I, Andersom L. Clark, Jr. a citizen of the United States, residing at 203 Clark Lane, Tullahoma, Tennessee 37388 have invented a mew and useful "Retractable Trailer Tongue".

BACKGROUND OF THE INVENTION

The present invention relates generally to trailers of the type designed to be towed behind a car or truck and more particularly, but not limited to, trailers to haul ski boats, fishing boats, and the like. My invention is an improvement over existing trailers, my improvement being directed to a trailer tongue that can be shortened to accommodate storage of a trailer in a confined space including a safety function which reduces the likelihood of the trailer being stolen.

It will be appreciated by those skilled in the art that trailers connected to cars or trucks by a ball-and-socket trailer hitch connection between the trailer and a car or truck towing the trailer require a tongue of adequate length to space the trailer per se from the vehicle to allow for a reasonable turning radius. If the tongue of the trailer is too short, the turning radius will be limited when the rear comer of the car or truck binds against the frame of the trailer. By having a trailer tongue of a length equal to at least ½ the width of the towing vehicle, a 90° turn can be accomplished without the towing vehicle binding against the tongue or the trailer.

Modem trailers, particularly heavier trailers and trailers which haul heavier loads, require their own braking system rather than relying on the braking system of the towing vehicle to brake both the vehicle and the trailer.

It has become somewhat of a standard practice to provide a brake actuator for the trailer, a device generally referred to as a "coupler", within the length of the tongue of the trailer so that the length of the tongue can be employed for a purpose in addition to the purpose of providing a separation between the trailer and the towing vehicle. The coupler senses an acceleration of the trailer relative to the towing vehicle or a deceleration of the towing vehicle relative to the trailer and actuates a braking system on the trailer to prevent a jackknifing of the trailer relative to the towing vehicle or a runaway trailer that can result in crashes and serious property damage and bodily injury to those involved.

Trailers of the type just described, and particularly those used to haul pleasure boats, are becoming larger and larger to accommodate larger boats. Unfortunately, garage spaces which are the traditional storage location for individually owned pleasure boats when not moored at a dock slip, have not grown larger and larger. Thus, boat owners are confronted with the problem of having their trailers extending out of their garages because of the length of the tongue of the trailer and not being able to close the door of the garage because the length of the trailer, including the extended tongue, is greater than the depth of the garage.

In addition to problems associated with the length of the trailer as compared to the depth of the owner's garage, boats stored on trailers are an inviting target for thieves, particularly in those situations where the boat cannot be locked into the garage because the tongue of the trailer extends beyond the depth of the garage, preventing the boat owner from being able to close his garage door and lock it.

The concept of a telescoping trailer tongue has been in existence for many years, generally being used to facilitate the launching of a boat from the trailer. Applicant is aware of one effort to deal with the storage problem associated with the length of the tongue or draw bar of a boat trailer, U.S. Pat. No. 4,398,742 issued to Sanders in 1983. The Sanders '742 device however is not readily adaptable to the coupler system that is employed with braking trailers and is not readily adaptable as a modification of conventional trailer tongues.

A trailer tilting apparatus was disclosed in a patent issued to Waylon on Sep. 3, 1963, U.S. Pat. No. 3,102,649. This device was designed to allow a trailer to be tilted without drawing the trailer closer to the towing vehicle when unloading a boat from a trailer. The system disclosed by Waylon has some similarity to Applicant's invention but fails to cooperate properly with a brake actuator and is not readily adaptable as a modification to existing boat trailers.

What is needed then, and which is presently unavailable, is a device that can be attached to an existing boat trailer and which can be added as a modification to such trailers at a minimum of inconvenience and expense.

It is therefore an object of the present invention to provide such a device.

It is further an object of the present invention to provide a boat trailer tongue which is both telescopically extendable and retractable, which is pivotal, and which can be locked in a safety position or in an operable position. Such a device is lacking in the prior art.

SUMMARY OF THE INVENTION

My invention is a retractable tongue for a boat trailer, the retractable tongue including a slide and a slide housing, the slide being pivotally connected to the slide housing by a pin fitted through elongated slots in each side of the slide housing. The structure is enclosed in a housing to protect it from the elements and the housing has holes on each side of it through which a locking bar can be passed to lock the retractable tongue in a dropped down, inoperable position to thwart unauthorized use of the trailer. When the locking bar is removed, the slide can be rotated into an operable position and slid forward and locked into position for towing. A coupler is attached to the free end of the slide to provide a brake actuator between the towing vehicle and the trailer.

The remote end of the slide is terminated at an angle to the axis of the slide so that the slide can rotate within the slide housing a pre-determined distance to an inoperable position, but the slide will not rotate beyond a controlled point, thus forcing the slide to terminate in a dig-in position that would prevent the trailer from being towed should an unauthorized user attempt to move the trailer.

DESCRIPTION OF THE PREFERRED EMBODIMENT

My invention will be best understood when consideration is given to the preferred embodiment of the invention as is illustrated in FIGS. 1-11 of the accompanying drawings.

Figure 1:
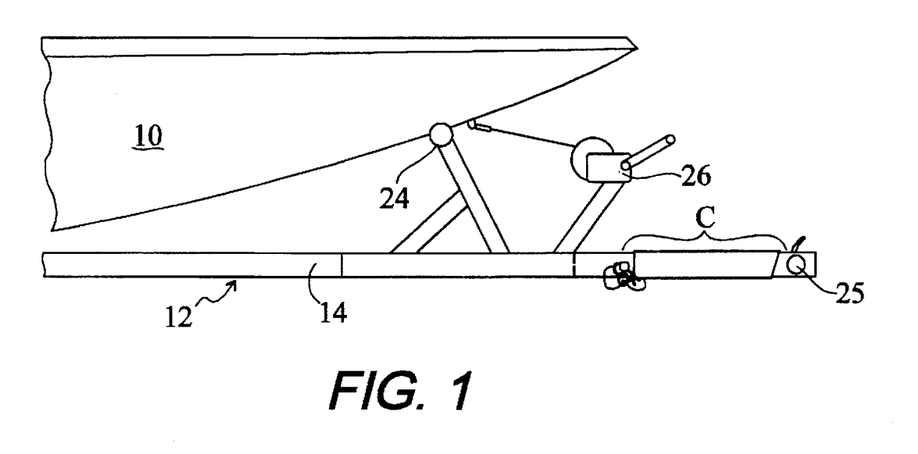
FIG. 1 is a side view in schematic illustration of a trailer carrying a boat with the tongue extended.
Figure 2:
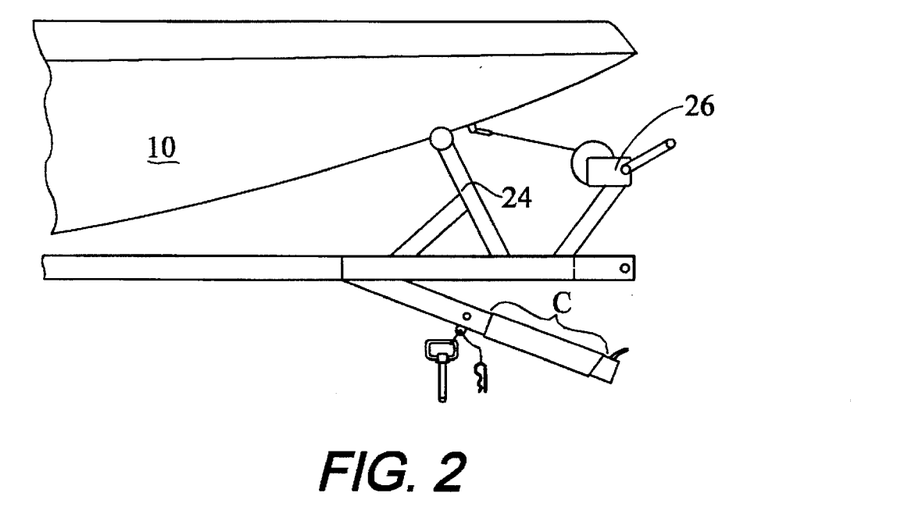
FIG. 2 is a side view of the trailer carrying a boat with the tongue retracted and lowered.

FIGS. 1 and 2 illustrate side views of a trailer with a boat mounted on the trailer and the tongue of the trailer modified to include the improved trailer hitch of my invention. As can be seen from FIGS. 1-4, a boat 10 is mounted on a trailer 12. The trailer 12 includes a frame 14 having rails 16 which are joined generally at an apex 18 at the front of the trailer. Spaced toward the rear of the trailer from the apex 18 is a cross bar 20 for support. In the general configuration of a boat trailer, a tongue 22 will be mounted between the rails 16, welded at one end to the cross bar 20 and protruding beyond the front of the trailer to provide a method of connecting the trailer to a towing vehicle.

As is the case with most trailers, the trailer illustrated in the preferred embodiment of the invention includes a boat bow support 24 extending upwardly from the front of the trailer and a wench 26 to assist in loading the boat onto and off of the trailer. And as is the case with most larger trailers, inserted between the forward-most end of the tongue of the trailer and the apex 18 of the frame is a coupler C (see FIG. 1) which serves as a brake actuating device. At the forward-most end of the trailer is a trailer ball socket 25 which will fit over the ball of a trailer hitch is mounted on the rear bumper of a towing vehicle.

Figure 5:
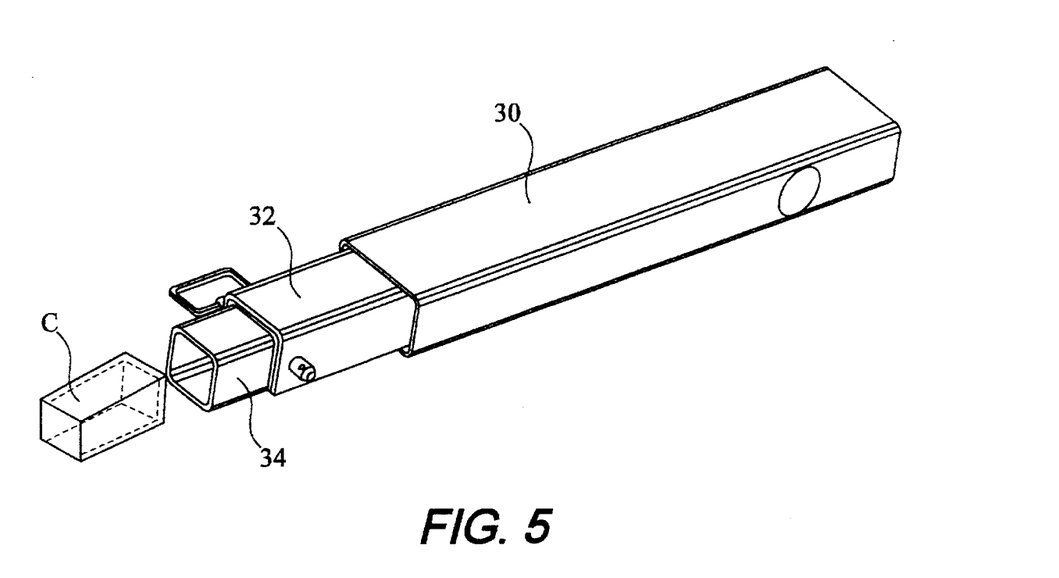
FIG. 5 is a perspective view of the improved trailer hitch tongue assembled.

Referring to FIG. 5, the improved swing-down trailer hitch is illustrated in perspective and assembled. In the improved trailer hitch of my invention, the housing 30 fits over the slide housing 32 which in turn fits over the slide 34. FIG. 5 also illustrates the rearward-most end of the coupler C that would be wielded to the stub portion of slide 34 that protrudes out of the slide housing 32 when the slide 34 is in its forward-most position. Only a portion of the coupler C is shown, the balance of the coupler being a standard product that is readily available on the market.

Figure 6:
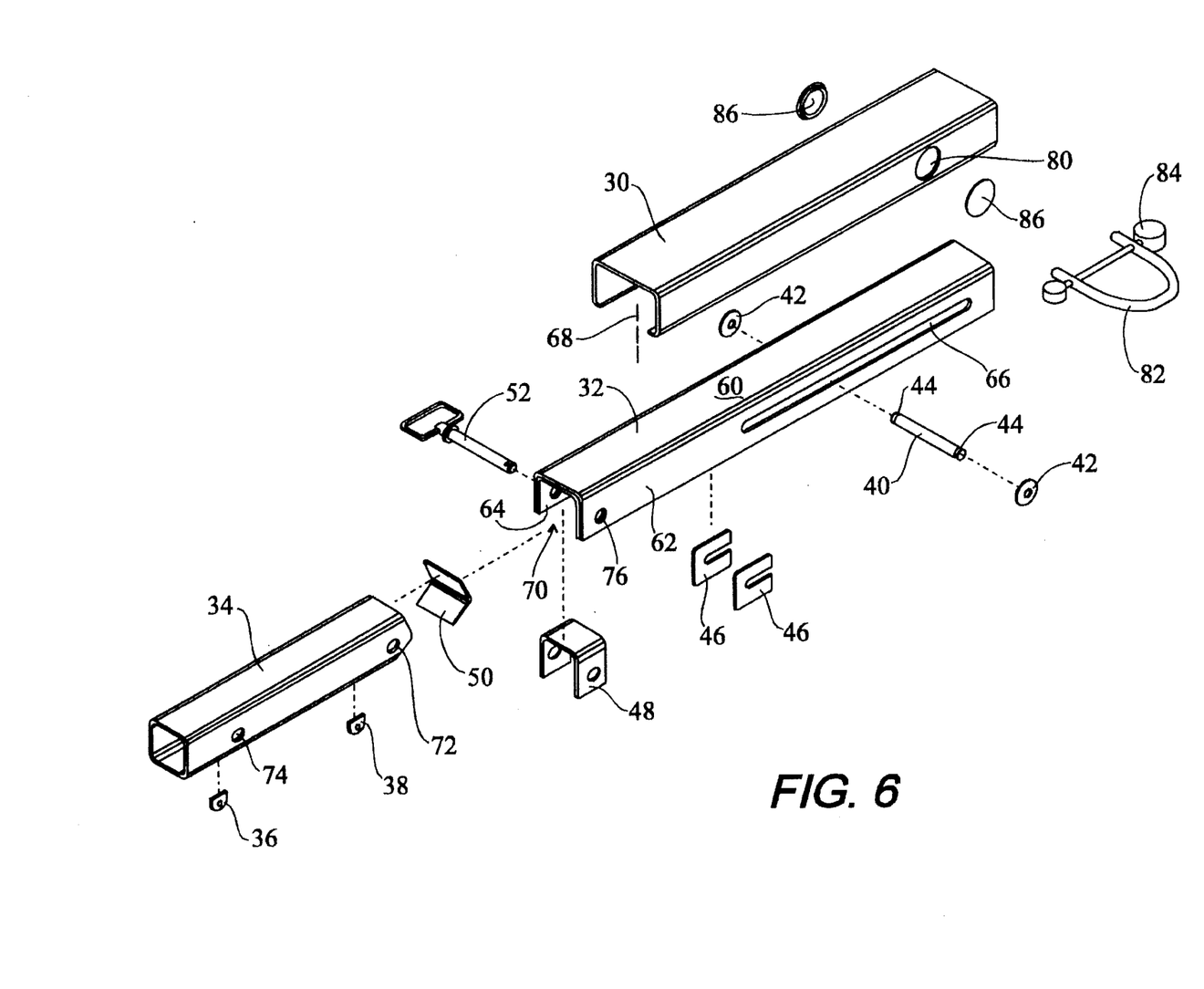
FIG. 6 is a schematic view of the improved trailer hitch with the parts illustrated in exploded relationship.

Referring now to FIG. 6, the details of the preferred embodiment of the swing-down trailer hitch of my invention is illustrated in detail. As can be seen from FIG. 6, the slide housing 32 has a U-shape cross section and is elongated, extending between the cross bar 20 and protruding forward of the apex 18 of the trailer frame 14. The slide housing 32 will be welded at its rearmost point to the cross bar 20 and will also, in the preferred embodiment, be welded or otherwise fixed to the rails 16 of the frame of the trailer in the area of the apex 18 of the trailer. The housing 30 simply acts as a cover for the slide housing 32; it protects the slide mechanism from the elements, but primarily, it provides protection for the mechanism of the swing-down trailer hitch from being damaged by impact from heavy objects, etc.

The housing 30 and slide housing 32 are fixed relative to each other, by being welded together and/or by being welded to adjacent parts such as the cross bar 20 and the rails 16. Thus, the slide housing 32 is a rigidly affixed portion of the trailer frame 14.

As previously indicated, the slide housing 32 is U-shaped in cross section, having a base 60 with depending legs 62 and 64. Legs 62 and 64 have elongated slots 66 (the slot 66 in leg 62 is shown in FIG. 6 with the slot and leg 64 being hidden by the perspective view of the device). The housing 30 is C-shaped to fit over the slide housing 32 and cupped about it with an elongated opening 68 on the underside thereof so that the open mouth portion 70 on the underside of the slid housing 32 is not enclosed by the housing 30.

The slide 34 fits within the channel created by the U-shaped cross section of the slide housing 32 and is movable telescopically within that channel. The slide 34 includes holes 72 at the rear and 74 at the front of the slide for the purposes as will be indicated hereinafter.

The mounting for the slide 34 within the slide housing 32 is the pin 40 which passes through the elongated slots 66, the holes 72 in the back side of the slide 34 and is fixed in place by the washer/snap ring assemblies 42 fitting over each end of the pin 40 within the annular groove 44 on each end of the pin 40. This connection of the slide to the slide housing 32 enables the slide 34 to move telescopically within the slide housing 32 and to move in a pivotal motion about the pin 40 to drop down through the passageway created by the opening 70 into the position shown in FIG. 2.

Because of the forces applied to the improved swing-down trailer hitch, side braces 46 are welded inside the channel of the slide housing 32 onto the legs 62, 64 at the front of the elongated slot 66 so that when the slide 34 is in its forward-most position, the slide housing 32 will be reinforced at the point of maximum pressure. In addition to the side braces 46, there is an end brace 48 which is U-shaped in cross section and has holes through it to register with the holes 76 in the front of the slide housing 32. Once again, the front brace 48 is to provide strength to the slide housing 32 at the point of maximum stress and force on the trailer hitch tongue.

Figure 3:
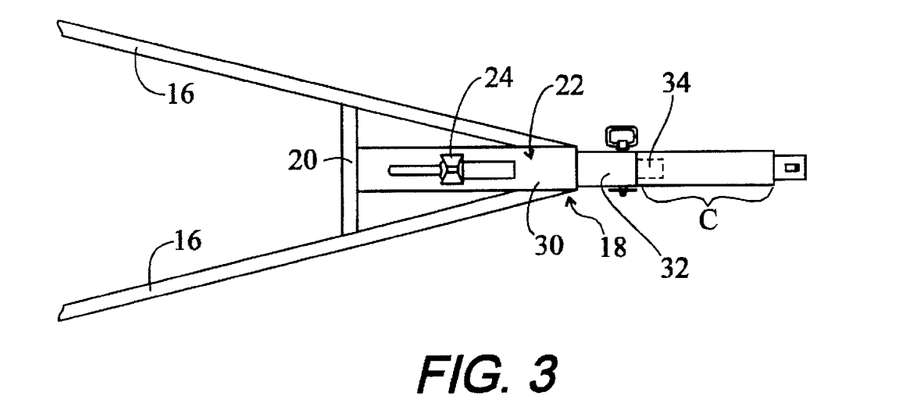
FIG. 3 is a top view in schematic of the trailer with the tongue extended.
Figure 4:
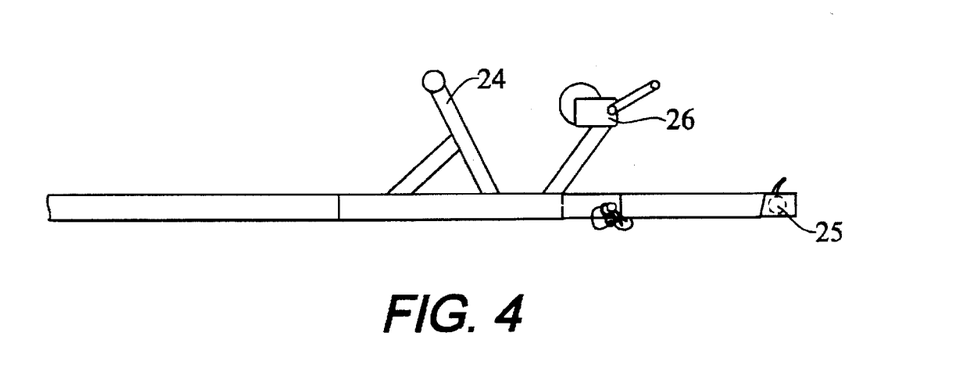
FIG. 4 is a side view of the trailer in schematic with the tongue extended.

In use, the slide 34 is movable between an operable position as shown in FIGS. 1, 3 and 4 and an inoperable position as is shown in FIG. 2. In the operable position, the slide 34 is pulled forward to telescope out of the end of the slide housing 32 and the pin 40 travels along the elongated slots 66 to the forward-most position of the slot. At that point, the holes 74 in the slide 34 and 76 in the slide housing 32 (and the holes in the front brace 48) are in registry and the slide 32 can be fixed in the operable position by inserting pin 52 through the holes 74, 76. A key may be provided to pass through a keyway in the end of the fastener pin 52 to keep it from backing out of the holes 74, 76 during travel of the trailer from one destination to another.

Figures 9, 10, 11:
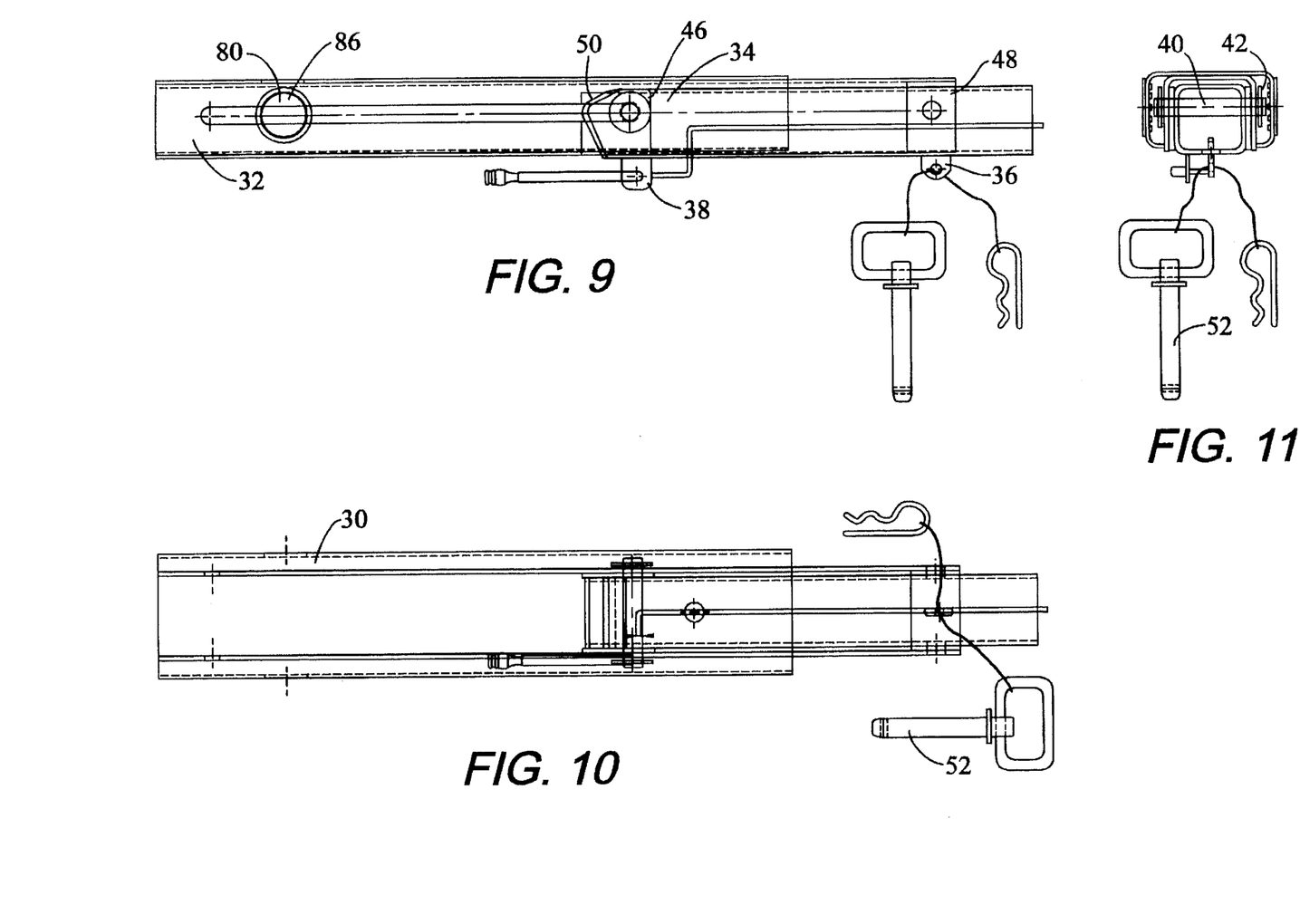
FIG. 9 shows a side view of the improved trailer hitch.
FIG. 10 shows a top view of the improved trailer hitch.
FIG. 11 shows an end view of the improved trailer hitch.

FIGS. 2, 6 and 9 illustrate best the safety/security features of the invention. When the trailer is being stored, the slide 34 will be retracted telescopically into the slide housing 32 while at the same time being rotated downwardly about the pin 40 so that it is no longer be concentrically registered with the channel of the slide housing 32. By dropping the slide 34 in relation to the slide housing 32, the coupler C, which is welded to the outside of the forward-most stub portion of the slide 34, can clear the slide housing 32, allowing the slide 34 to retract to its rearward-most position so that the pin 40 is at the back of the slot 66 in the slide housing 32. When the slide 34 is retracted fully, and rotated down to the position shown in FIG. 2, the length of the trailer is equal substantially to the length of the boat so that the trailer can be stored in a conventional garage without having the tongue of the trailer protruding beyond the garage door and prevent a garage door from being closed for security purposes. Thus, the trailer and boat can be stored in the garage, the garage door closed and locked and maximum security achieved.

Figure 7:
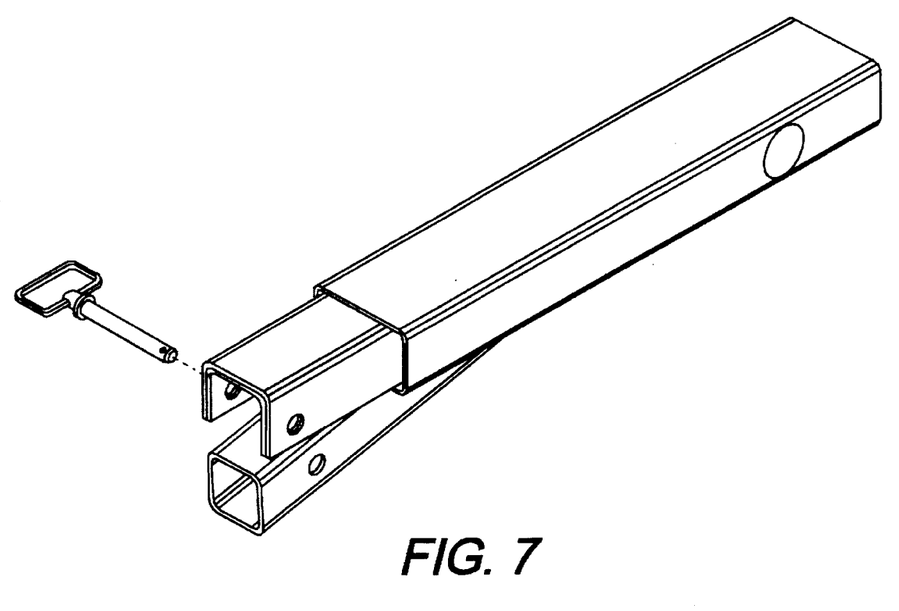
FIG. 7 is a perspective view of the improved hitch showing the slide in the dropped position.
Figure 8:
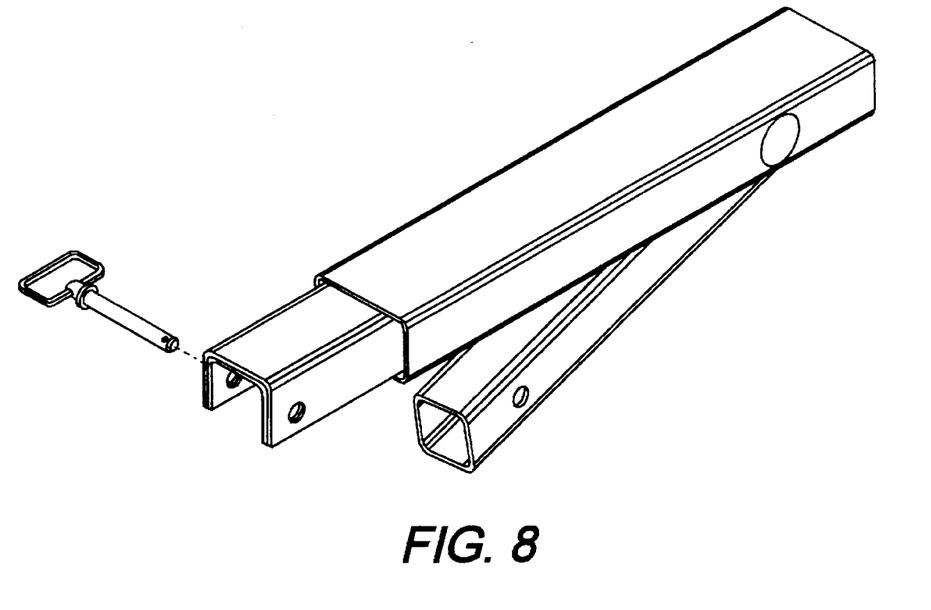
FIG. 8 is a perspective view of the trailer hitch showing the slide in a dropped and retracted position.

Another safety feature of the present invention goes into effect when the swing down trailer hitch of the present invention is rotated in the position shown in FIG. 2 (and as also illustrated in FIGS. 7 and 8). In that configuration, a bicycle lock or similar structure can be passed through the holes 80 in the back of the housing 30 and locked by any conventional locking mechanism. A traditional bicycle lock 82 is shown in FIG. 6. The lock 82 is U-shaped having parallel legs and one of the legs can be passed through the holes 80 with the other leg passing through the holes 80 and with the other leg passing outside the housing 30. Once the lock 82 is in place, a traditional lock 84 can be passed through openings in the ends of the legs of the member 82 and locked to prevent removal of the member 82 from the holes 80 absent the availability of a key to unlock the device 80. By this mechanism, as can be seen best from FIG. 9, when the slide 34 is in the rearward-most position and rotated downwardly, the leg of the bicycle lock 82 will pass over the top of the slide 34 and prevent it from being rotated up into the operable position shown in FIGS. 1, 3 and 4. By being held in the drop down position as is shown in FIG. 2, the trailer, for all practical purposes, cannot be towed. If one were to attempt to try to raise the trailer high enough to get the socket 25 over a ball, the rear of the boat would interfere with the raising of the trailer, would drag, or otherwise prevent the trailer from being raised to a height to allow it to be towed in that manner. Any effort to try to tow the trailer by connecting to the apex 18 with a chain or other similar arrangement would result in the end of the drop down tongue digging into the ground and preventing the trailer from being towed.

As can be seen from FIG. 9, other features of the preferred embodiment of the present invention include a fastener 36 at the front and a brake line bracket 38 toward the rear of the slide 34. The preferred embodiment also includes caps 86 which plug into the holes 80 of the housing 30 to improve the appearance and protective feature of the housing 30. Finally, cap 50 is provided to cover the rear portion of the slide 34 and to mate with the angular shape of the rear of the slide 34 which serves to limit the extent of downward rotation of the slide 34. As can be seen from FIG. 9, the downward rotation of the slide 34 is limited to approximately 30°–45° so that the drop down tongue will serve as a impediment to the towing of the trailer when the tongue is locked in the inoperable position. The back side of the slide binds against the top of the slide housing and cannot be rotated 180° to fit against the frame of the trailer and out of the way in an event that an unauthorized person were attempting to tow the trailer.

Although there have been described particular embodiments of the present invention of a new and useful Retractable Trailer Tongue, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. An improved tongue for a trailer having wheels intended to roll over a surface constituting the travel path of the trailer, a frame forming a perimeter of the trailer, and a tongue having opposing ends, one end connected to said frame and the other end extending from said frame and having a socket at said other end for connection to the ball of a trailer hitch mounted on a towing vehicle; the improvements including:

a. an elongated slide housing mounted to said frame and extending from a point inside the perimeter of the frame and terminating at a point proximately outside the perimeter of the frame;

b. a slide within said slide housing;

c. means connecting said slide to said slide housing whereby said slide can telescopically move from an at rest position within said slide housing to a towing position extending out of said slide housing;

d. means connecting said slide to said slide housing whereby said slide can rotate relative to said slide housing in a direction toward the surface over which the wheels are designed to pass;

e. means limiting the rotational movement of said slide relative to said slide housing to prevent said slide from being rotated 180° relative to said slide housing; and f. means for locking said slide in a fixed relationship to said slide housing when said slide has been retracted within said housing and rotated relative to said slide housing in a direction toward the surface over which the wheels are designed to pass.

2. The device of claim 1 further including means for fixing said slide relative to said slide housing when said slide is moved to the towing position.

3. The device of claim 1 further including an enclosure housing mounted over said slide housing and fixed relative thereto for protecting said slide housing and said slide from damage.

4. The device of claim 1 wherein said trailer is a boat trailer and the slide housing terminates at a point substantially coterminous with the bow of a boat mounted on the trailer.

5. The device of claim 1 wherein said slide is substantially box-shaped in cross section and said slide housing is U-shaped in cross section whereby said slide can telescopically move within said slide housing to an at rest position within said slide housing and a towing position extending beyond the end of said slide housing.

6. The device of claim 5 wherein said slide can rotate out of said slide housing when in the at rest position, so that the other end of the tongue will tend to dig into the surface over which the trailer passes if an attempt is made to move the trailer while the tongue is located in the at rest position.

7. The device of claim 5 wherein said slide housing has depending legs and elongated slots in said legs and a pin extends through said slots and through said slide whereby said slide can move longitudinally of said slide housing as said pin travels along the length of said slots and can move rotationally relative to said slide housing by rotating about the pin.

8. The device of claim 3 wherein said locking means includes a U-shaped bracket having opposing legs and one of the legs is passed through openings in said slide housing and said enclosure housing to prevent movement of the slide relative to the slide housing.

* * * * *